(12) United States Patent
Nord et al.

(10) Patent No.: US 10,574,403 B2
(45) Date of Patent: Feb. 25, 2020

(54) SYSTEM AND METHOD FOR PROTECTING DATA TRANSMISSION

(71) Applicant: Sony Corporation, Tokyo (JP)

(72) Inventors: Lars Nord, Lund (SE); Rickard Ljung, Helsingborg (SE)

(73) Assignee: Sony Corporation, Tokyo (JP)

(*) Notice: Subject to any disclaimer, the term of this patent is extended or adjusted under 35 U.S.C. 154(b) by 13 days.

(21) Appl. No.: 15/528,596

(22) PCT Filed: Dec. 1, 2014

(86) PCT No.: PCT/EP2014/076096
§ 371 (c)(1),
(2) Date: May 22, 2017

(87) PCT Pub. No.: WO2016/086954
PCT Pub. Date: Jun. 9, 2016

(65) Prior Publication Data
US 2017/0279564 A1 Sep. 28, 2017

(51) Int. Cl.
*H04L 1/18* (2006.01)
*H04L 1/22* (2006.01)
*H04W 72/04* (2009.01)

(52) U.S. Cl.
CPC .......... *H04L 1/1861* (2013.01); *H04L 1/1883* (2013.01); *H04L 1/22* (2013.01); *H04W 72/0453* (2013.01)

(58) Field of Classification Search
None
See application file for complete search history.

(56) References Cited

U.S. PATENT DOCUMENTS 9,014,067 B2 4/2015 Chun et al.
9,337,983 B1 5/2016 Oroskar et al.
(Continued)

FOREIGN PATENT DOCUMENTS

WO 2013120253 A1 8/2013
WO 20130120253 8/2013
(Continued)

OTHER PUBLICATIONS

Alcatel-Lucent Shanghai Bell et al., "Considerations on LBT Enhancements for Licensed-Assisted Access", 3GPP Draft; R1-144083—LBT—Final, 3rd Generation Partnership Project (3GPP), Mobile Competence Centre; 650, Route Des Lucioles, F-06921 Sophia-Antipolis Cedex; France, vol. RAN WG1, No. Ljubljana, Slovenia; 20140806-2040810, Oct. 5, 2014, XP050895043, Retrieved from the Internet: URL: http://www.3gpp.org/ftp/Meetings_3GPP_SYNC/RAN1/Docs/ [retreived on Oct. 5, 2014].
(Continued)

*Primary Examiner* — Donald L Mills
(74) *Attorney, Agent, or Firm* — Tucker Ellis LLP

(57) ABSTRACT

Communication between a cellular network (102) and a communication device (101) occurs in a first frequency band (111) and a second frequency band (112), the second frequency band (112) being at least partly different from the first frequency band (111). A data packet is sent in the first frequency band (111). Depending on an acknowledgment of receipt of the data packet, the data packet is selectively sent in the second frequency band (112).

15 Claims, 6 Drawing Sheets

(56) References Cited

U.S. PATENT DOCUMENTS

| | | | |
|---|---|---|---|
| 9,723,516 B2 | 8/2017 | Bhushan | |
| 10,045,221 B2 | 8/2018 | Jose | |
| 2002/0106991 A1* | 8/2002 | Foore | H04W 28/08 455/70 |
| 2009/0164862 A1 | 6/2009 | Sågfors et al. | |
| 2009/0207005 A1* | 8/2009 | Habetha | G08G 1/162 340/435 |
| 2009/0285160 A1 | 11/2009 | Cheng et al. | |
| 2009/0303978 A1 | 12/2009 | Pajukoski et al. | |
| 2010/0238870 A1 | 9/2010 | Mitra et al. | |
| 2010/0284360 A1 | 11/2010 | Dalsgaard et al. | |
| 2010/0318871 A1 | 12/2010 | Lee et al. | |
| 2014/0126580 A1* | 5/2014 | Sampath | H04L 1/1819 370/428 |
| 2014/0245095 A1 | 8/2014 | Nammi et al. | |
| 2014/0293919 A1 | 10/2014 | Yoon et al. | |
| 2015/0016410 A1 | 1/2015 | Lee et al. | |
| 2015/0063148 A1 | 3/2015 | Sadek | |
| 2015/0065152 A1 | 3/2015 | Sadek et al. | |
| 2015/0078253 A1* | 3/2015 | Morosawa | H04L 69/18 370/328 |
| 2015/0085797 A1* | 3/2015 | Ji | H04J 3/16 370/329 |
| 2015/0110026 A1 | 4/2015 | Lee et al. | |
| 2015/0172931 A1 | 6/2015 | Jose et al. | |
| 2015/0256303 A1 | 9/2015 | Belghoul et al. | |
| 2015/0257150 A1 | 9/2015 | Yi et al. | |
| 2015/0295692 A1 | 10/2015 | Gowda et al. | |
| 2015/0351115 A1* | 12/2015 | Jeon | H04W 48/16 455/450 |
| 2015/0373674 A1* | 12/2015 | Han | H04W 16/14 370/329 |
| 2016/0088625 A1 | 3/2016 | Kadous et al. | |
| 2016/0112892 A1 | 4/2016 | Damnjanovic et al. | |
| 2016/0119922 A1* | 4/2016 | Ye | H04W 74/004 370/336 |
| 2016/0191375 A1 | 6/2016 | Gopala Krishnan et al. | |
| 2016/0269978 A1* | 9/2016 | Bashar | H04J 11/00 |
| 2017/0094681 A1* | 3/2017 | Takeda | H04W 16/14 |
| 2017/0164301 A1* | 6/2017 | Jeon | H04W 52/283 |
| 2017/0295576 A1* | 10/2017 | Fukuta | H04W 16/14 |

FOREIGN PATENT DOCUMENTS

| | | |
|---|---|---|
| WO | 20140189913 | 11/2014 |
| WO | 2015094751 A1 | 6/2015 |
| WO | 20150094751 | 6/2015 |

OTHER PUBLICATIONS

International Search Report and Written Opinion; dated Jul. 27, 2015; issued in International Patent Application No. PCT/EP2014/076096.

3GPP TSG RAN WG1 Meeting #78bis; Ljubljana, Slovenia, Oct. 6-10, 2014; Source: CATT; Required functionalities for Licensed-Assisted Access Using LTE; 6 pages.

\* cited by examiner

SYSTEM AND METHOD FOR PROTECTING DATA TRANSMISSION

FIELD OF THE INVENTION

Various embodiments relate to a communication device, to a node of a cellular network, and to corresponding methods. In particular, various embodiments relate to techniques of protecting uplink transmission and/or downlink transmission between the communication device and the cellular network.

BACKGROUND OF THE INVENTION

With increasing popularity of mobile voice and data communication, there is an ever increasing demand for high-speed voice and data communication. The licensed spectrum for cellular communication is rapidly being exhausted by a dense and growing subscriber base. This applies in particular to the valuable low-frequency bands with low propagation loss traits.

A significant amount of unlicensed spectrum or unlicensed bands is available. For illustration, a significant amount of spectrum is globally available in the 5 GHz frequency band. Within the Long Term Evolution (LTE) radio access technology as specified by the Third Generation Partnership Project (3GPP), it is desirable to employ the unlicensed bands. It is desirable to utilize the License Assisted Access-LTE (LAA-LTE) procedure to augment the capacity of licensed frequency bands in the unlicensed bands. LAA-LTE may be used for carrying data traffic for mobile services. The purpose of LAA-LTE is to extend LTE cellular communication to the unlicensed spectrum. Sometimes, LAA-LTE is also referred to as LTE-unlicensed (LTE-U).

In the licensed frequency bands, there is typically operator control over resource management both in frequency and time domain. This is referred to operator-controlled network deployment. Further, transmission may be protected by employing Automatic Repeat Request (ARQ) schemes. Typically, the resource management and/or the ARQ scheme is implemented to a significant degree in the Data Link Layer comprising the Medium Access (MAC) layer, according to the Open System Interconnection (OSI) Model standardized by the International Telecommunication Union (ITU).

Employing LAA-LTE or transmission of data packets typically faces restrictions in terms of transmission reliability. Protection of successful transmission may be possible to a limited degree only. E.g., if compared to the licensed spectrum, the ARQ process can be less predictable, as the medium is shared in a more or less uncontrolled manner between different parties. E.g., the transmission channel in the unlicensed band could be used by third parties. E.g., the unlicensed band could be used by other network providers, private persons and other business segments. Third parties could employ LTE, Wireless Local Area Network (WiFi), radar and/or other communication problems. The so-called hidden node problem may occur where the transmitting device may not be able to detect interfering radio signals.

BRIEF SUMMARY OF THE INVENTION

Therefore, a need exists to provide advanced techniques of protecting uplink transmission and/or downlink transmission between a communication device and a cellular network. In particular, a need exists for such techniques which employ the opportunities offered by the unlicensed spectrum and/or LAA-LTE while, at the same time, a reliable uplink transmission and/or downlink transmission is ensured.

This need is met by the features of the independent claims. The dependent claims define embodiments.

According to an aspect, a communication device is provided. The communication device comprises a wireless interface. The wireless interface is configured to communicate with a cellular network in a first frequency band. The wireless interface is further configured to communicate with a cellular network in a second frequency band. The second frequency band is at least partly different from the first frequency band. The communication device further comprises at least one processor. The at least one processor is configured to send a data packet to the cellular network via the wireless interface in the first frequency band. The at least one processor is further configured to check if receipt of the data packet is acknowledged by the cellular network. The at least one processor is further configured to selectively send a data packet to the cellular network via the wireless interface in the second frequency band, depending on said checking.

According to an aspect, a method is provided. The method comprises at least one processor of a communication device sending a data packet to the cellular network via wireless interface of the communication device in a first frequency band. The method further comprises the at least one processor checking if receipt of the data packet is acknowledged by the cellular network. The method further comprises, depending on said checking, the at least one processor selectively sending the data packet to the cellular network via the wireless interface in a second frequency band. The second frequency band is at least partly different from the first frequency band.

According to an aspect, a node of a cellular network is provided. The node comprises a wireless interface. The wireless interface is configured to communicate with a communication device connected to the cellular network in a first frequency band. The wireless interface is further configured to communicate with the communication device in a second frequency band. The second frequency band is at least partly different from the first frequency band. The node further comprises at least one processor. The at least one processor is configured to send a data packet to the communication device via the wireless interface in the first frequency band. The at least one processor is further configured to check if receipt of the data packet is acknowledged by the communication device. The at least one processor is further configured to selectively send the data packet to the communication device via the wireless interface in the second frequency band depending on said checking.

According to an aspect, a method is provided. The method comprises at least one processor of a node of a cellular network sending a data packet to a communication device connected to the cellular network via wireless interface of the node in the first frequency band. The method further comprises the at least one processor checking if receipt of the data packet is acknowledged by the communication device. The method further comprises, depending on said checking the at least one processor selectively sending the data packet to the communication device via the wireless interface in a second frequency band. The second frequency band is at least partly different from the first frequency band.

According to a further aspect, a node of a cellular network is provided. The node comprises a wireless interface. The wireless interface is configured to communicate with the communication device connected to the cellular network in a first frequency band. The wireless interface is further configured to communicate with the communication device in a second frequency band. The second frequency band is at least partly different from the first frequency band. A node further comprises at least one processor configured to receive a data packet from the communication device via the wireless interface in the first frequency band. The at least one processor is further configured to check if receipt of the data packet is successful. The at least one processor is further configured to selectively receive the data packet from the communication device via the wireless interface in the second frequency band, depending on said checking.

According to a further aspect, a method is provided. The method comprises at least one processor of a node of a cellular network, receiving a data packet from a communication device via wireless interface of the node in a first frequency band. The method further comprises the at least one processor checking if receipt of the data packet is successful. The method further comprises the at least one processor selectively receiving the data packet from the communication device via the wireless interface in a second frequency band, depending on said checking. The second frequency band is at least partly different from the first frequency band.

According to an aspect, a communication device is provided. The communication device comprises a wireless interface which is configured to communicate with the cellular network in a first frequency band and to communicate with the cellular network in a second frequency band. The second frequency band is at least partly different from the first frequency band. The communication device further comprises at least one processor. The at least one processor is configured to receive a data packet from the cellular network via the wireless interface in the first frequency band. The at least one processor is further configured to check if receipt of the data packet is successful. The at least one processor is further configured to selectively receive the data packet from the cellular network via the wireless interface in the second frequency band, depending on said checking.

According to an aspect, a method is provided. The method comprises at least one processor of a communication device connected to a cellular network receiving a data packet from the cellular network via a wireless interface of the communication device in a first frequency band. The method further comprises the at least one processor checking if receipt of the data packet is successful. The method further comprises the at least one processor selectively receiving the data packet from the cellular network via the wireless interface in a second frequency band, depending on said checking. The second frequency band is at least partly different from the first frequency band.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Figure 1:
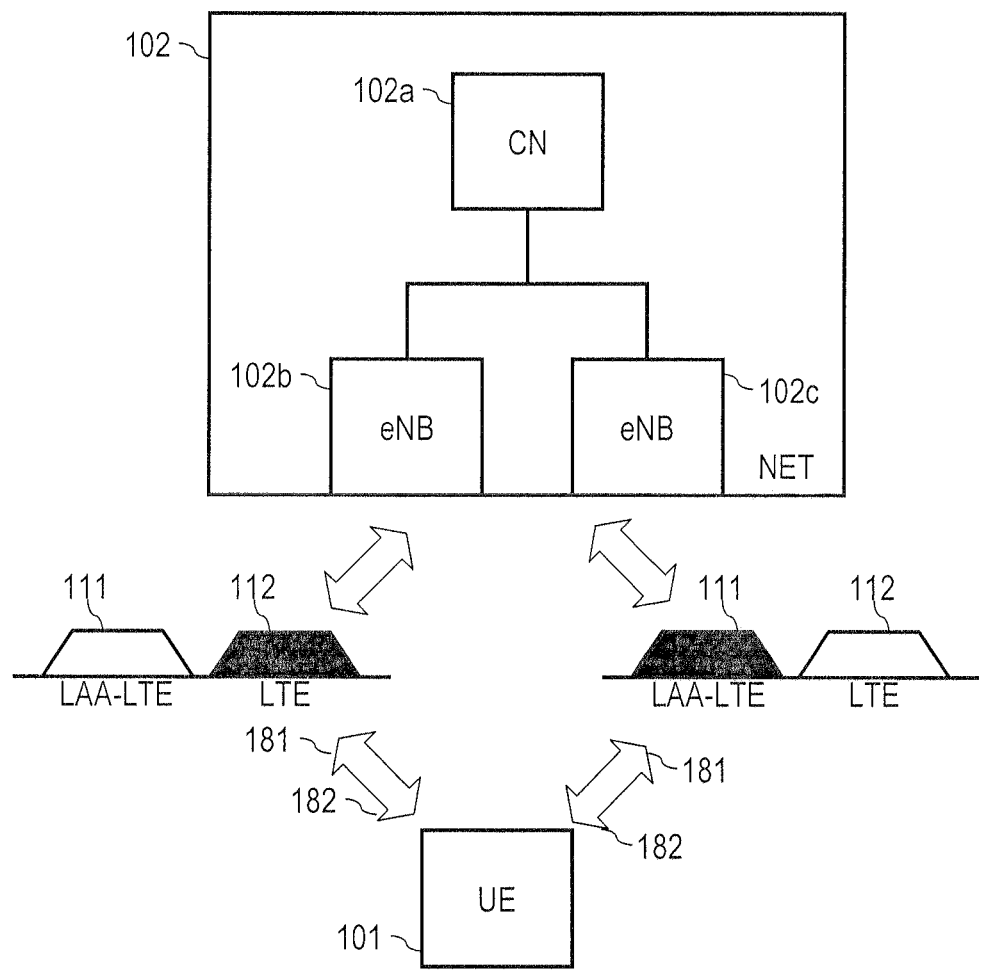
FIG. 1 is a schematic representation of a communication device connected to a cellular network communicating with the cellular network via a first frequency band and via a second frequency band according to various embodiments.

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of protecting uplink transmission of a data packet from a communication device to a cellular network are described. Furthermore, techniques of protecting downlink transmission of a data packet from the cellular network to the communication device are described. Both techniques relate to, first, transmitting the data packet via a first frequency band; depending on whether receipt of the data packet is successful, the data packet is selectively transmitted via a second frequency band. In this regard, it is possible to check if receipt of the data packet has been acknowledged, e.g., not acknowledged negatively and/or positively acknowledged, etc.

Hereinafter, for illustrative purposes reference will be primarily made to the transmission of the data packet relying on 3GPP LTE radio access technology. In particular, reference will be made to the first frequency band being an unlicensed frequency band and the transceiving of data packets via the unlicensed frequency band being according to the LAA-LTE transmission procedure; for sake of simplicity, the first frequency band will therefore be referred to as the LAA-LTE frequency band. Likewise, reference will be primarily made to the second frequency band being a licensed frequency band and the transceiving of data packets via the licensed frequency band (LTE frequency band) being according to the conventional licensed LTE data transmission procedure. Yet, it should be understood that such techniques may be readily applied to different kinds of frequency bands and different kinds of radio access technology. E.g., a scenario is possible where communication via the first frequency band is according to the 3GPP Universal Mobile Telecommunications System (UMTS) radio access technology, while communication via the second frequency band is according to the 3GPP LTE radio access technology. it is possible that transmitting the data packet in the first frequency band employs a listen-before-talk traffic control technique. Transmitting the data packet in the second frequency band may employ a central resource scheduling scheme as a traffic control technique. Hence, collision avoidance techniques may be according to a bottom-up approach in the first frequency band and according to a top-down approach in the second frequency band.

In FIG. 1, the communication between the communication device (UE) 101 and the cellular network 102 (labelled NET in FIG. 1) is shown. As can be seen from FIG. 1, there are two communication channels available for the communication. A first communication channel employs the first frequency band 111; a second communication channel employs the second frequency band 112. In the scenario of FIG. 1, the communication is according to the 3GPP LTE access technology. Communication via the first LAA-LTE frequency band 111 employs the 3GPP LAA-LTE radio access technology; communication via the second LTE frequency band 112 employs the conventional 3GPP LTE radio access technology. The transmission in FIG. 1 is bi-directionally between the UE 101 and the cellular network 102: uplink transmission 181 is possible from the UE 101 to the cellular network 102; downlink transmission 182 is possible from the cellular network 102 to the UE 101.

Generally, the type and kind of the UE 101 is not particularly limited. E.g., the UE 101 may be one of a mobile phone, a smartphone, tablet, a personal digital assistant, a mobile music player, a smart watch, a wearable electronic equipment, and a mobile computer.

In the scenario of FIG. 1, the cellular network 102 comprises two access nodes in the form of evolved Node Bs (eNBs) 102*b*, 102*c* for communication via the LAA-LTE frequency band 111 and the LTE frequency band 112, respectively. Because there are two access nodes employed, this scenario is sometimes referred to as dual connectivity. It is also possible that one and the same access node supports communication via the LAA-LTE frequency band 111 and the LTE frequency band 112; as in such a scenario there is a single access node employed, this scenario is sometimes referred to as co-located. If two access nodes are employed, the two access nodes may be co-located. The eNBs 102*b*, 102*b* are connected to the core network 102*a* of the cellular network 102.

In FIG. 1, a scenario is illustrated where transmission 181, 182 between the UE 101 and the cellular network 102 relies on the two frequency bands 111, 112. Generally, it is possible that the transmission 181, 182 between the UE 101 and the cellular network 102 relies on a larger number of frequency bands (not shown in FIG. 1). E.g., it is possible that there is more than one unlicensed frequency band available for the transmission 181, 182. Then, it is possible that the transmission 182, 182 is distributed between the licensed frequency band 112 and all available unlicensed frequency bands.

Further, in FIG. 1, a scenario is shown, where the LAA-LTE frequency band 112 is different from the LTE frequency band 111, i.e., not overlapping in frequency space. Generally, it is possible that the frequency bands 111, 112 are at least partly different from each other; e.g., it is possible that the frequency bands 111, 112 are at least partly overlapping in frequency space.

Hereinafter, techniques are described which enable to protect the transmission 181, 182 of one or more data packets between the UE 101 and the cellular network 102. This protection employs a fallback scenario: If the transmission 181, 182 via the LAA-LTE frequency band 111 is unsuccessful or fails, transmission 181, 182 via the LTE frequency band 112 is used as a fallback. According to the techniques described hereinafter, this fallback is configurable; i.e., a trigger criterion which triggers the fallback may be flexibly set and/or negotiated between the cellular network 102 and the UE 101.

E.g. one trigger criterion for the fallback to transmission 181, 182 via the LTE frequency band 112 may be acknowledgement of the transmission 181, 182 of the one or more data packets via the LAA-LTE frequency band 111. E.g., in a scenario where the uplink transmission 181 from the UE 101 of the cellular network 102 is protected, it is possible that the receiving entity 101, 102 checks if the one or more data packets have been successfully received; this may be achieved by employing a reception window technique and/or acknowledgement requests. Depending on said checking, it is possible that the receiving entity 101, 102 positively acknowledges and/or negatively acknowledges the transmission 181, 182 of the one or more data packets. This may be done by means of a dedicated acknowledgement message. Block acknowledgement and/or implicit acknowledgement may be relied upon. Then, the sending entity 101, 102 may check the acknowledgement status and use this acknowledgement status as the decision criterion for triggering the fallback.

Examples are given hereinafter. E.g., for protection of uplink transmission 181, it is possible that the UE 101 checks if receipt of the one or more data packets is acknowledged by the cellular network 102. Then, depending on said checking, it is possible that the UE 101 is configured to selectively send the one or more data packets to the cellular network 102 in the LTE frequency band 102. Likewise, in the scenario where downlink transmission 182 from the cellular network 102 to the UE 101 is protected, it is possible that the eNB 102*c* checks if receipt of the one or more data packets is acknowledged by the UE 101; then, the eNB 102*b* can be configured to selectively send the one or more data packets to the UE 101 in the LTE frequency band 112 depending on said checking.

E.g., in the scenarios of uplink transmission 181 and downlink transmission 182 as mentioned above, it is possible that positive acknowledgement and/or negative acknowledgement of the transmission 181, 182 of the one or more data packets is monitored. E.g., if the successful transmission 181, 182 of the one or more data packets between the UE 101 and the cellular network 102 is not positively acknowledged, it is possible that the fallback to the LTE frequency band 112 is triggered. Likewise, it is possible that if only negative acknowledgements or no acknowledgements at all are received for the transmission 181, 182 of the one or more data packets between the UE 101 and the cellular network 102, the fallback to the transmission via the LTE frequency band 112 is triggered. As can be see from the above, various trigger criteria for triggering the fallback of transmission 181, 182 via the LTE frequency band 112 are conceivable. Generally, such decision criteria can be combined in various manners according to various embodiments.

Employing such techniques as explained allows achieving various effects. E.g., it is possible that a comparably high transmission reliability is achieved. This may be the case because transmission 181, 182 is first attempted via the LAA-LTE frequency band 111 and then, additionally, attempted via the LTE frequency band 112. In particular, the transmission 181, 182 via the LTE frequency band 112 may be comparably fail-safe and reliable. Transmission protection may be possible in the LAA-LTE frequency band 111 and/or the LTE frequency band 112 based on various protection techniques such as a Hybrid ARQ (HARQ) scheme and Forward Error Correction (FEC). E.g., if the protected transmission that employs the LAA-LTE protocol in the LAA-LTE frequency band 111 fails, then the remaining HARQ procedure can be executed in the LTE frequency band 112. As a further effect, it may be possible to reduce the signalling load imposed on the LTE frequency band 112; this is because a first try of transmission 181, 182 is executed in the LAA-LTE frequency band 111.

Generally, it is possible that the transmission 181, 182 of the one or more data packets via the LAA-LTE frequency band 111 is protected using a first HARQ scheme; likewise, the transmission 181, 182 via the LTE frequency band 112 can be protected using a second ARQ scheme. Here, the first and second HARQ schemes may differ with respect to one or more corresponding configuration parameters such as a transmission retry counter, a transmission timeout timer, a transmission retry timer, block acknowledgement, and/or immediate acknowledgement, etc. By such techniques, an better balance between reliability of transmission of the data packet one the one hand and load balancing between the LAA-LTE frequency band 111 and the LTE frequency band 112 may be achieved.

Figure 2:
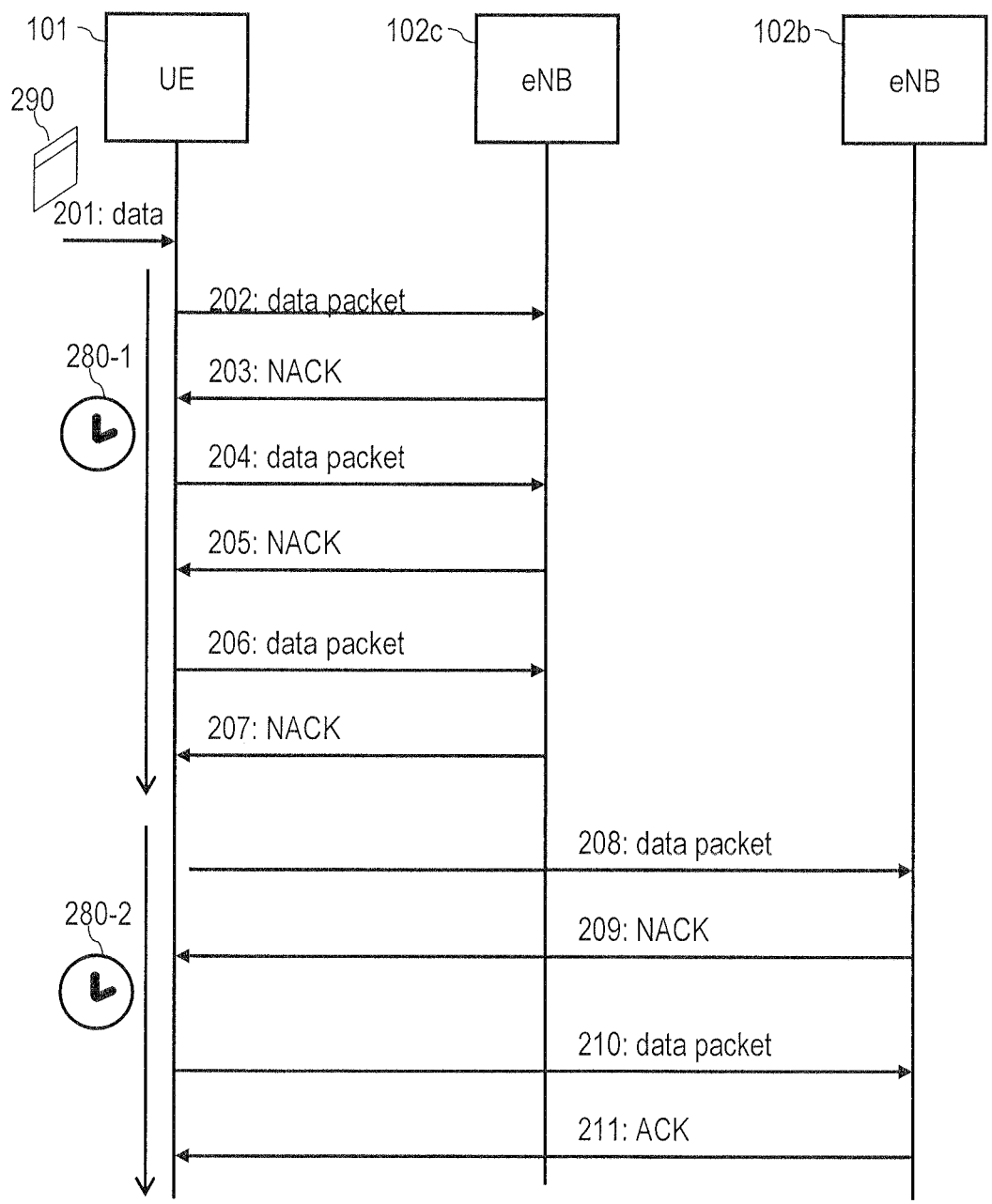
FIG. 2 is a signalling diagram illustrating protection of uplink transmission of a data packet from the communication device to the cellular network according to various embodiments.

Turning to FIG. 2, a signaling diagram for communication between the UE 101 and the eNBs 102b, 102c is illustrated for scenarios where the uplink transmission 181 of a data packet 290 is protected.

In FIG. 2, the UE 101 has a memory (not shown in FIG. 2) which is controlled to implement a transmission buffer. E.g., the transmission buffer may reside in the MAC layer according to the ITU OSI model. At 201, the data packet 290 is received from a higher layer and written to the transmission buffer.

Execution of 201 triggers initialization of a transmission timeout timer 280-1. E.g., the transmission timeout timer 280-1 may be initialized when the packet 290 is received from the higher layer or when the packet is written to the transmission buffer or some time later.

At 202, the data packet 290 is sent via the LAA-LTE frequency band 111 to the eNB 102c. The eNB 102c checks if receipt of the data packet 290 is successful. Checksums may be employed. Forward Error Correction (FEC) may be employed. Yet, in the scenario of FIG. 2, the data packet 290 cannot be received successfully at least in parts. Thus, the transmission is unsuccessful. I.e., parts or all of the data packet 290 may be lost; it may not be possible or only possible with comparably low reliability to re-construct missing parts of the data packet 290 employing, e.g., FEC.

Because the transmission is unsuccessful at 202, a negative acknowledgement 203 is sent from the eNB 102c to the UE 101. In case the transmission of the data packet 290 should have been successful (not shown in FIG. 2), a positive acknowledgement would have been sent from the eNB 102c to the UE 101 (not shown in FIG. 2).

The transmission of the negative acknowledgement 203 successful, i.e., the UE 101 receives the negative acknowledgement 203 which, in turn, indicates that the transmission of the data packet 290 at 202 was not successful. At this point, the transmission timeout timer 280-1 has not expired yet.

Because of this, the UE 101 retries transmission of the data packet 290 at 204. Again, the uplink transmission 181 of the data packet 290 is unsuccessful at 204 which triggers the negative acknowledgment 205. Then, the UE 101 again re-sends the data packet 290 at 206; again, the uplink transmission 181 is unsuccessful which triggers the sending of the negative acknowledgement 207. As can be seen, the transmission 181 of the data packet 290 at 202, 204, 206 occurs as part of a first ARQ scheme which tries to successfully transmit the data packet 290 via the LAA-LTE frequency band 111.

Then, the retransmission timeout timer 280-1 expires. This is the trigger criterion for executing the fallback to uplink transmission 181 of the data packet 290 via the LTE frequency band 112, i.e., to the eNB 102b. At 208, this uplink transmission 181 of the data packet 290 via the LTE frequency band 112 commences. Also the uplink transmission 181 of the data packet 290 at 208 is unsuccessful; this triggers the sending of the negative acknowledgement 209 from the eNB 102b to the UE 101 via the LTE frequency band 111. The UE 101 receives the negative acknowledgement 209 which triggers re-sending of the data packet 290 at 210. Finally, the transmission 210 of the data packet 290 is successful, i.e., the eNB 102b successfully receives the data packet 290 without errors. This successful receiving of the data packet 290 at 210 is positively acknowledged at 211.

From FIG. 2, it can be seen that the uplink transmission 181 via the LTE frequency band 112 is accompanied by monitoring transmission timeout employing a further transmission timeout timer 280-2. The further transmission timeout timer 280-2 does not expire before receipt of the data packet 290 is positively acknowledged at 211 by the cellular network 102. However, if the further transmission timeout timer 280-2 would have expired before the packet 290 is positively acknowledged (not shown in FIG. 2), the nodes 102b, 102c are allowed to delete all buffered data relating to that packet 290 from their receive buffers (not shown in FIG. 2). Potential further retransmission are handled by layers higher than the MAC layer, e.g., according to the Transmission Control Protocol (TCP).

As will be appreciated from the above, the transmission timeout of the uplink transmission 181 of the data packet 290 via the LAA-LTE frequency band 111 is monitored. When the transmission timeout timer 280-1 has not yet expired, checking if receipt of the data packet 290 is acknowledged by the cellular network 102 yields that the receipt of the data packet 290 is not positively acknowledged, i.e., no positive acknowledgement has been received, but only the negative acknowledgements 203, 205, 207 are received. This trigger re-sending the data packet 290 via the LAA-LTE frequency band 111 at 204, 206. When the transmission timeout timer 280-1 has expired, checking if receipt of the data packet 290 is acknowledged by the cellular network 102 yields again that the receipt of the data packet 290 is not positively acknowledged. This triggers the uplink transmission 181 via the LAA-LTE frequency band 112. I.e., if the monitoring of the transmission timeout yields an elapsed transmission timeout timer 280-1 of the data packet 290, sending of the data packet 290 to the cellular network 102 in the LTE frequency band 112 is executed. By such techniques, it can be ensured that the communication system comprising the UE 101 and the cellular network 102 at least has the possibility to arrange for successfully transmission on the lower layers employing the LTE frequency band 112.

Next, the uplink transmission 181 of the data packet 290 from the UE 101 to the eNB 102b via the LTE frequency band 112 at 208, 210 is discussed in detail. As will be appreciated from the above, the further transmission timeout monitored by the further transmission timeout timer 280-2. If the checking yields that the receipt of the data packet 290 is not acknowledged by the cellular network 102 and depending on said monitoring of the further transmission timeout, the UE 101 selectively re-sends the data packet 290 via the LTE frequency band 112; this is the case at 210.

In the scenario of FIG. 2, the transmission timeout timer 280-1 and the further transmission timeout timer 280-2 are employed. Alternatively or additionally to relying on the transmission timeout timers 280-1, 280-2, it is possible to implement one or more retransmission counters (not shown in FIG. 2).

Generally, the transmission timeout timers 280-1, 280-2 and/or the retransmission counters can be seen to be part of a respective ARQ scheme. Hence, in the scenario of FIG. 2, properties of a corresponding first ARQ scheme for protecting the uplink transmission 181 via the LAA-LTE frequency band 111 are set and further properties of a corresponding second ARQ scheme for protecting the uplink transmission 182 via the LTE frequency band 112 are set. Such properties of the ARQ schemes may be preset according to fixed rules; alternatively or additionally, they could be configured by the cellular network 102 on a per-connection basis. For the latter, Radio Resource Control (RRC) control signalling according to the 3GPP LTE radio access technology may be employed. Here it is noted that the RRC control signalling for setting properties of the ARQ scheme protecting transmission via the LAA-LTE frequency band 111 may be handled via the LTE frequency band 112.

Generally, it is possible that the monitoring of the transmission timeout for the uplink and/or downlink transmission 181, 182 via the LAA-LTE frequency band 111 and/or the monitoring of the transmission timeout of the uplink and/or downlink transmission 181, 182 via the LTE frequency band 112 relies on a threshold comparison. In particular, it is possible that a threshold comparison is executed between a predetermined threshold and the transmission timeout timer 280-1, respectively the retransmission counter (not shown in FIG. 2). The predetermined threshold can be chosen such that it corresponds to sending the data packet 290 to the cellular network 102 in the LAA-LTE frequency band 111 for a time duration which is shorter than a lifetime indication of the data packet 290.

Likewise, it is possible that a further threshold comparison is executed between a further predetermined threshold and the further transmission timeout timer 280-2, respectively a further retransmission counter (not shown in FIG. 2). The further predetermined threshold can, again, correspond to the sending of the data packet 290 to the cellular network 102 in the LTE frequency band 112 for a time duration which is shorter than the lifetime indication of the data packet 290.

Depending on the implementation of the monitoring of the transmission timeout, the predetermined threshold and/or the further predetermined threshold may also be referred to as initialization value of the corresponding transmission timeout timers, respectively retransmission counters.

In such scenarios as discussed above, it is possible that—in view of the potentially limited lifetime of the data packet 290—transmission attempts are distributed across the LAA-LTE frequency band 111 and the LTE frequency band 112. Thus, over the entire lifetime of the data packet 290, transmission is attempted in both frequency bands 111, 112. This allows increasing the likelihood for successful transmission of the data packet 290.

As mentioned above, the predetermined threshold and/or the further predetermined threshold as properties of corresponding ARQ schemes may be determined based on a control message received from the cellular network 102, e.g., in the LTE frequency band 111; such a scenario corresponds to large degrees of the decision logic for configuring the monitoring of the transmission timeout residing in the cellular network 102. In this respect, it is possible that the operation of the UE 101 is at least partly remote controlled by the cellular network 102. Alternatively or additionally, it is possible that the predetermined threshold and/or the further predetermined threshold are determined by a lifetime indication of the data packet 290. E.g., the lifetime indication of the data packet 290 may be implicitly given according to pre-configured quality of service (QoS) rules implemented by the UE 101. It is also possible that the lifetime indication of the data packet 290 is received by the MAC layer from a higher layer.

Figure 3:
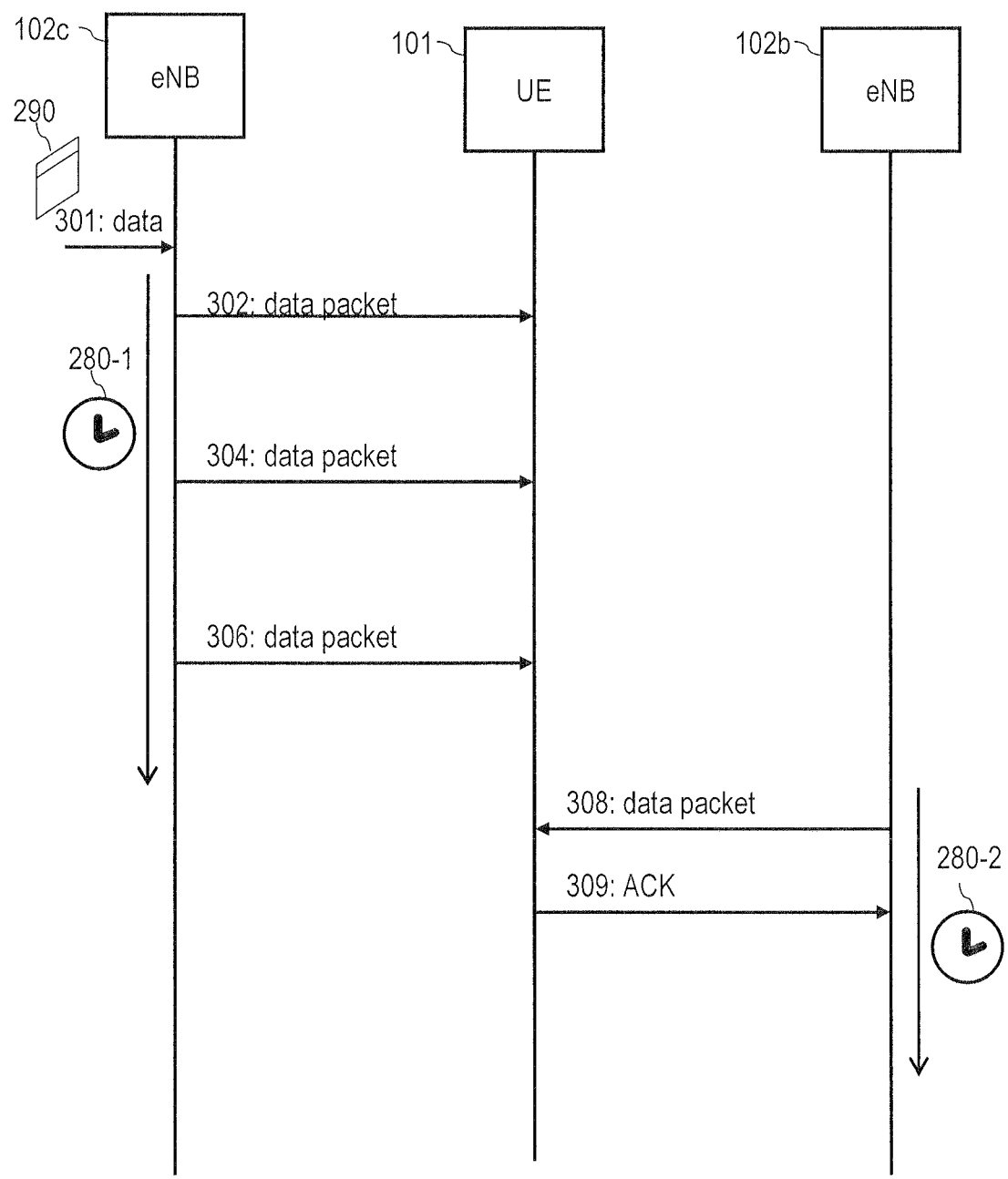
FIG. 3 is a signalling diagram illustrating protection of downlink transmission of a data packet from the cellular network to the communication device according to various embodiments.

In FIG. 3, a scenario is illustrated which is comparable to the scenario of FIG. 2; however, while FIG. 2 relates to the protection of the uplink transmission 181, FIG. 3 relates to the protection of the downlink transmission 182 from the cellular network 102 to the UE 101.

At 301, the data packet 290 is received by the MAC layer of the eNB 102c and stored in a respective transmit buffer (not shown in FIG. 3). This triggers initialization of the transmission timeout timer 280-1. The data packet 290 is unsuccessfully transmitted to the UE 101 in the LAA-LTE frequency band 111 a number of times at 302, 304, 306. None of downlink transmissions 182 at 302, 304, 306 is positively acknowledged. It could be possible in various scenarios, that each one of the downlink transmissions at 302, 304, 306 is negatively acknowledged (not shown in FIG. 3).

Then, monitoring of the transmission timeout yields that the transmission timeout timer 280-1 has elapsed or expired and that by then the data packet 290 has not been positively acknowledged by the UE 101. Because of this, a fallback to the LTE frequency band 112 is executed. Here, the first downlink transmission 182 of the data packet 290 at 308 is positively acknowledged 309 by the UE 101 and further retransmission attempts are not required. In particular, the downlink transmission 182 at 308 of the data packet 290 is positively acknowledged at 309 before a monitoring of the transmission timeout yields that a further transmission timeout timer 280-2 has elapsed or expired.

As can be seen, from a comparison of FIGS. 2 and 3, the techniques relied upon for protecting the uplink transmission 181 of the data packet 290 are comparable to the techniques relied upon for protecting the downlink transmission 182 of the data packet 290. E.g., while with respect to FIG. 3, a scenario has been shown where the first ARQ scheme employed to protect the downlink transmission 182 in the LAA-LTE frequency band 111 does not rely on negative acknowledgements, similar techniques may also be applied with respect to the first ARQ scheme which is employed to protect the uplink transmission 181 in the first frequency band 111 (cf. FIG. 2).

Further, while with respect to FIGS. 2 and 3, acknowledgement schemes which rely on individual acknowledgement of the data packet 290 have been primarily described, it is also possible to use implicit acknowledgement schemes and/or block acknowledgement schemes. Such techniques may rely on a more or less implicit acknowledgement of the receipt of the data packet 290, e.g., by signalling a lower bound and/or an upper bound of a sender window and/or reception window and/or by acknowledging a plurality of data packets at one time.

Figure 4:
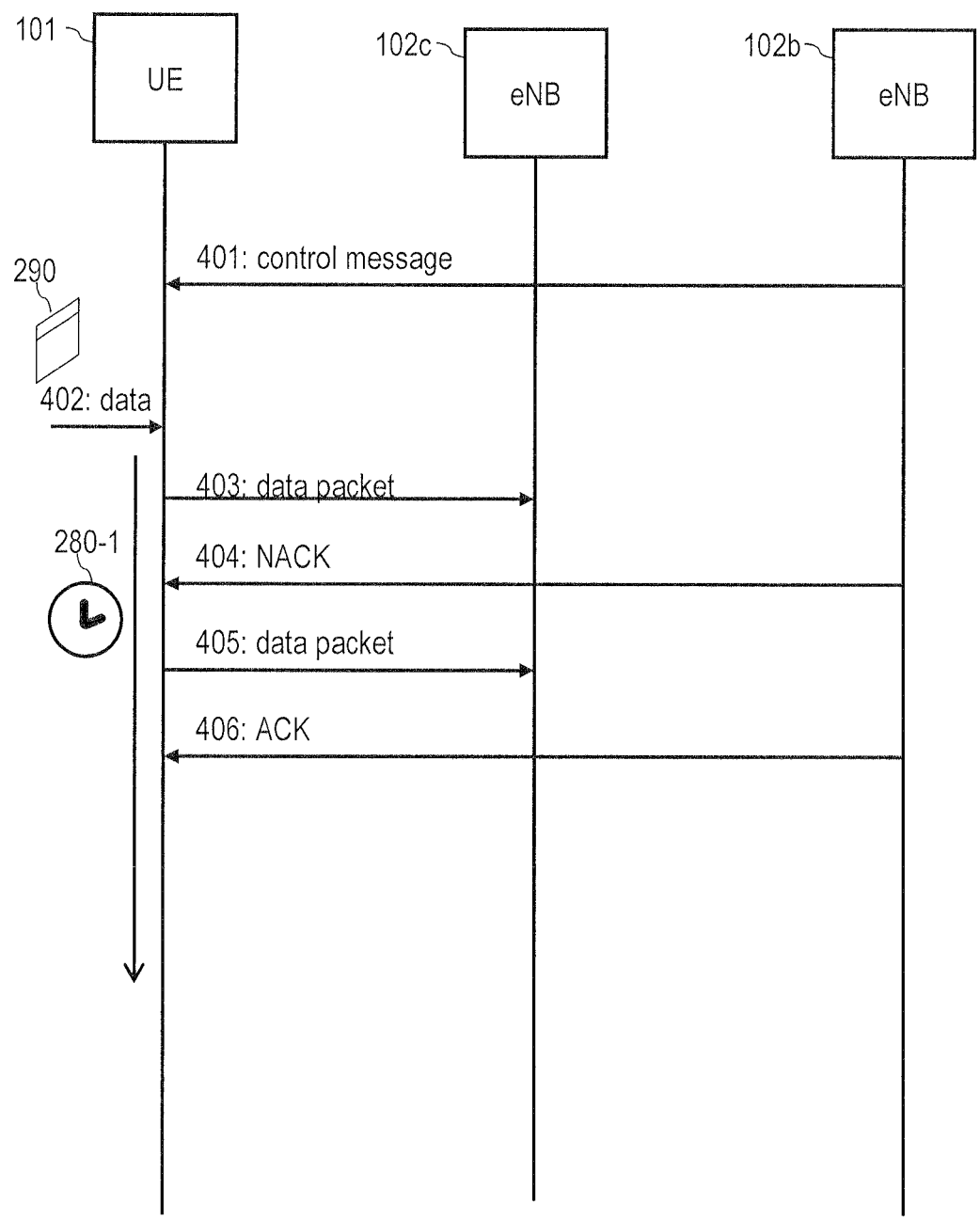
FIG. 4 is a signalling diagram illustrating protection of uplink transmission of a data packet from the communication device to the cellular network according to various embodiments.

In FIG. 4, yet a further scenario is illustrated. In FIG. 4, a control message 401 sent via the LTE frequency band 112 is employed to control properties of the first ARQ scheme employed by the UE 101 to protect the uplink transmission 181 of the data packet in the LAA-LTE frequency band 111. The control message 401 can be according to the RRC scheduling of the 3GPP LTE radio access technology. E.g., the control message 401 can specify a value of the transmission timeout timer 280-1. Generally, it is possible that properties of the ARQ schemes employed at the UE 101 and/or the cellular network 102 are at least partly remote controlled. While also the scenario of FIG. 4 relates to protecting the uplink transmission 181 of the data packet 290 from the UE 101 to the cellular network 102, similar techniques may be readily applied for protecting the downlink transmission 182.

In the scenario of FIG. 4, the second uplink transmission 181 of the data packet 290 from the UE 101 to the eNB 102c in the LAA-LTE frequency band 111 at 405 is successful; because of this, the second uplink transmission 181 at 405 is positively acknowledged at 406. Because the transmission of the data packet 290 in the LAA-LTE frequency band 111 has already been positively acknowledged at 406 before the transmission timeout timer 280-1 expires, it is not necessary to execute the fallback to uplink transmission 181 of the data packet 290 via the LTE frequency band 112.

With respect to the scenario of FIG. 4, it is noted that the control signalling is handled via the LTE frequency band 112; i.e., the control message 401 according to the RRC framework is sent in the LTE frequency band 112, as well as the positive and negative acknowledgements at 404, 406. In other words, the ARQ scheme employed by the UE 101 to protect the uplink transmission 181 of the data packet 290 in the LAA-LTE frequency band 111 relies at least partly on resources in the LTE frequency band 112. Thus, while payload data transmission is handled by the LAA-LTE frequency band 111, a high transmission reliability or the control signalling can be achieved by relying on the LTE frequency band 112.

In a case, as discussed with respect to FIG. 4 where at least parts of the properties of the first ARQ scheme employed by the UE 101 to protect the uplink transmission 181 of the data packet 290 in the LAA-LTE frequency band 111 are controlled by the cellular network 102, it is possible that the cellular network 102 gets better control over the total traffic load on the LTE frequency band 112. This can be achieved by allowing the cellular network 102 specifying, e.g., the number of additional retransmission in the LTE frequency band 112 is zero; likewise, it is possible that a value of the further retransmission timer 280-2 (cf. FIG. 2) is set to zero. Likewise, it is possible that a timer value of the transmission timeout timer 280-1 for transmission in the LAA-LTE frequency band 111 is set to zero. In such a scenario, it is possible that the cellular network 102 fully controls the traffic load on the LTE frequency band 111, lower layer transmission delay, and transmission buffer requirements of the UE 101 in a dynamic manner. In particular, it is possible that the respective control logic of the cellular network 102 considers a current interference situation in the LAA-LTE frequency band 111; the current interference situation may have a significant impact on a transmission reliability for transmissions 181, 182 in the LAA-LTE frequency band 111. Here, the cellular network 102 may autonomously determine the interference situation and/or rely on respective indications received from the UE 101 via at least one of the LAA-LTE frequency band 111 and the LTE frequency band 112.

Generally, in such scenarios where the logic for setting properties of the ARQ scheme implemented to protect transmission via the LAA-LTE frequency band 111 resides at least partly in the cellular network 102, it is possible that a control message indicating corresponding properties of said ARQ scheme is sent via the LTE frequency band 112. The ARQ properties may include the predetermined threshold for comparison with the transmission timeout time 280-1 and/or a corresponding retransmission counter. The ARQ properties may be determined based on the interference situation, respectively the traffic load in the LAA-LTE frequency band 111. Alternatively or additionally, the properties may be determined based on a quality report of the UE 101. The quality report may indicate such properties as the Channel Quality Report (CQI), a packet error rate, a bit error rate, a retransmission statistic of retransmission attempts of the UE 101, etc. Such information may be referred to as interference awareness reporting; such information may be directly or indirectly indicative of the interference situation in the LAA-LTE frequency band 111. The quality report may be sent from the UE 101 to the cellular network 102 in the LTE frequency band 112.

Above, scenarios have been discussed where the decision logic for certain properties of the ARQ scheme implemented to protect the uplink transmission 181 and/or the downlink transmission 182 via the LAA-LTE frequency band 111 resides at least partly in the cellular network 102. Likewise, it is possible that scenarios are implemented where the respective decision logic resides at least partly at the UE 101. Then, the respective control message for remote control may be sent by the UE 101 to the cellular network 102 in the LTE frequency band 112.

Figure 5:
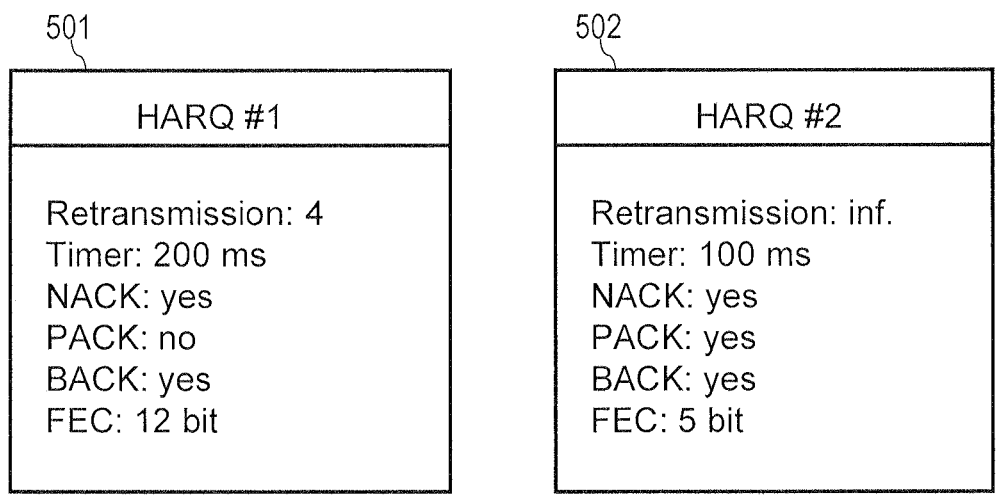
FIG. 5 is a schematic illustration of a first ARQ scheme and a second ARQ scheme for protection of transmission of the data packet according to various embodiments.

In FIG. 5, the first ARQ scheme 501 and the second ARQ scheme 502 are shown. In the scenario of FIG. 5, Hybrid ARQ (HARQ) schemes 501, 502 are employed which rely on, both, FEC, as well as retransmission controlled by the ARQ scheme. The first HARQ scheme 501 is for protecting the uplink and/or downlink transmission 181, 182 via the LAA-LTE frequency band 111; respectively, the second ARQ 502 is employed to protect uplink and/or downlink transmission 181, 182 via the LTE frequency band 112.

As can be seen from FIG. 5, the first ARQ scheme 501 differs from the second ARQ scheme 502 in that at least some of their properties differ from each other. E.g., the number of retransmission attempts, i.e., a predefined threshold or timer initialization value to be compared with a retransmission counter, equals four in the scenario of the first ARQ scheme 501—while it equals infinity in the scenario of the second ARQ scheme 502. Further properties of the ARQ schemes 501, 502 which are illustrated in FIG. 5 are: a predefined threshold to be compared with a transmission timeout timer 280-1, 280-2; a flag indicating the use of negative acknowledgements; a flag indicating the use of positive acknowledgements; a flag indicating the use of block acknowledgements; and a size of a FEC checksum.

In particular, in the case where uplink transmission 181 from the UE 101 to the cellular network 102 is protected employing the ARQ schemes 501, 502, it is possible that all or some of these properties of the ARQ schemes 501, 502 are set by the cellular network 102. E.g., it is possible that at least one property of the first ARQ scheme 501 is determined based on at least one of the interference situation in the LAA-LTE frequency band 111 and the quality report received from the UE 101. E.g, the UE 101 can be configured to send the quality report via the wireless interface in the LTE frequency band 112. The quality report can specify such parameters as the CQI, the packet error rate, the bit error rate, retransmission statistics, etc. Generally, the quality report can be indicative of an interference awareness of the UE 101 for transmission in the first frequency band 101. Then, the cellular network 102 can be configured to send a respective control message to the UE 101 in the second frequency band 112. The control message indicating the respective property of the first ARQ scheme 501.

Figure 6:
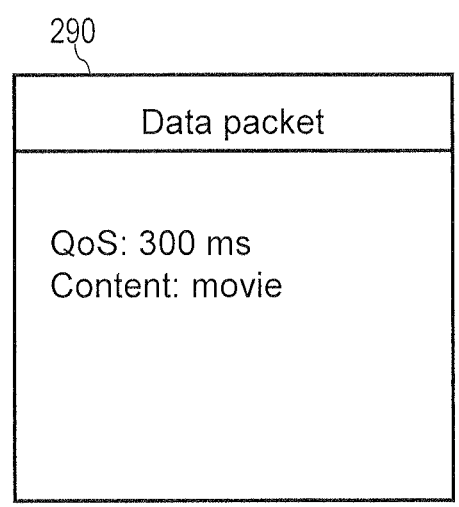
FIG. 6 is a schematic illustration of the data packet according to various embodiments.

In FIG. 6, the data packet 290 is illustrated at greater detail. The data packet 290 comprises a header and a payload portion (not shown in FIG. 6). In the header, various properties of the data packet 290 can be specified. In particular, it is possible that a QoS parameter is associated with the data packet 290; the QoS parameter can at least implicitly specify the lifetime of the data packet 290. E.g., said association of the QoS parameter may be achieved by transmitting the data packet 290 via a specific bearer. Each bearer may be assigned a certain QoS parameter. E.g., streaming movie would be assigned a specific QoS parameter which may be different than, e.g., voice over Internet Protocol (VoIP). As the data packet 290 is associated with a specific bearer, the data packet 290 is implicitly associated with the corresponding QoS parameter. Further, a content indicator is included in the header portion of the data packet 290. Also from the content indication it is possible to conclude on the lifetime of the data packet 290.

Figure 7:
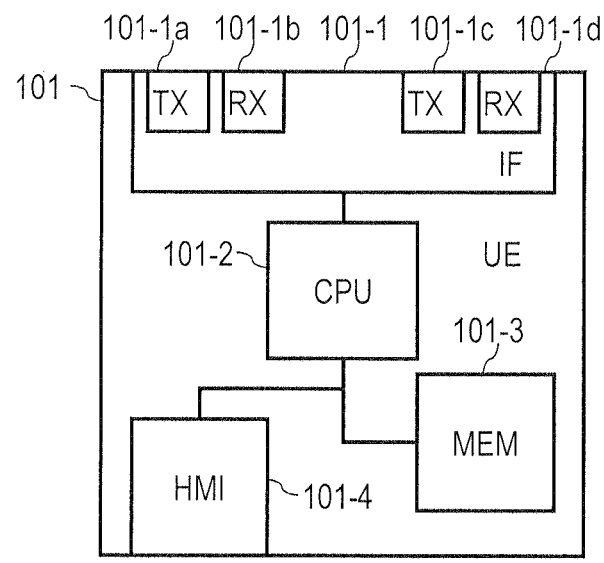
FIG. 7 is a schematic illustration of the communication device at greater detail according to various embodiments.

FIG. 7 is schematic illustration of the UE 101. The UE 101 comprises a processor 101-2. E.g., the processor 101-2 can be a multi-core processor; alternatively or additionally, it is possible to rely on distributed computing.

Further, the UE 101 comprises a memory 101-3. E.g., the memory can be a volatile or non-volatile memory. Control data is stored in the memory 101-3. When the control data is executed by the processor 101-2, techniques according to various embodiments as explained above in connection with protecting uplink transmission 181 and/or downlink transmission 182 are executed. In particular, the processor 101-2, when executing the control data received from the memory 101-3, can be configured to send the data packet 290 to the cellular network 102 via the wireless interface 101-1 in the LAA-LTE frequency band 111 and/or in the LTE frequency band 112; further, the processor 101-2 can be configured to check if receipt of the data packet 290 is acknowledged by the cellular network 102. Further, the processor 101-2 can be configured to employ the first ARQ scheme 101 and/or the second ARQ scheme 502; further, the processor 101-2 can be configured to monitor the transmission timeout by executing a threshold comparison between the transmission timeout timers 280-1, 280-2 and a respective predefined threshold.

As can be seen from FIG. 7, the wireless interface 101-1 of the UE 101 comprises a first transmitter 101-1a and a first receiver 101-1b for transceiving in the LAA-LTE frequency band 111; further, the wireless interface 101-1 comprises a second transmitter 101-1c and a second receiver 101-1d for transceiving in the LTE frequency band 112. Depending on the particular choice of the LAA-LTE frequency band 111 and the LTE frequency band 112, it is also possible that the wireless interface 101-1 only comprises a single transceiver which is configured to communicate in, both, the LAA-LTE frequency band 111 and the LTE frequency band 112 (a scenario not shown in FIG. 7).

The UE 101 further comprises a human machine interface (HMI) 101-4. It is possible to receive user instructions from a user via the HMI 101-4. Further it is possible to output information to the user via the HMI 101-4. The HMI 101-4 may comprise a touchpad, a mouse, a keyboard, a voice recognition unit, one or more control lights, a display, and/or one or more buttons, etc.

Figure 8:
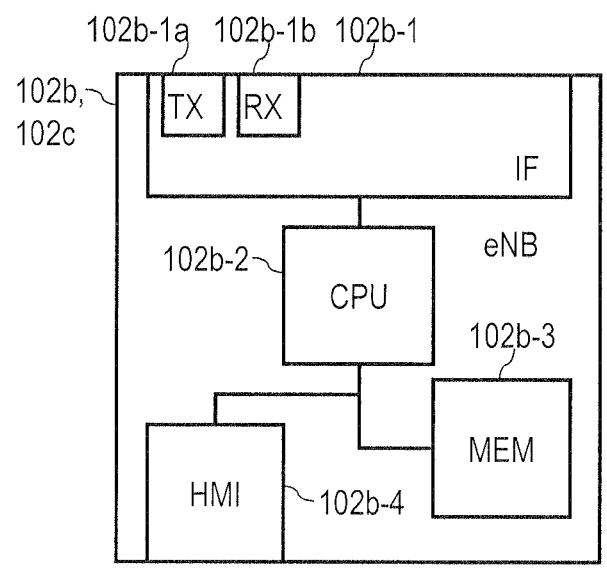
FIG. 8 is a schematic illustration of a node of the cellular network according to various embodiments.

In FIG. 8, the eNBs 102b, 102c are illustrated at greater detail. The eNBs 102b, 102c comprise a processor 102b-2, e.g., the processor 102b-2 can be a multi-core processor and/or rely on shared computing.

Further, the eNBs 102b, 102c comprise a memory 102b-3. The memory 102b-3 can be a volatile or a non-volatile memory. The memory 102b-3 comprises control data which, when executed by the processor 102b-2, causes the processor 102b-2 to execute techniques according to various embodiments as explained above. In particular, when the processor 102b-2 executes the control data received from the memory 102b-3, the processor 102b-2 can execute techniques as explained above relating to the protection of uplink transmission 181 and/or downlink transmission 182. In particular, the processor 102b-2, when executing the control data received from the memory 102b-3, can be configured to send the data packet 290 to the communication device 101 via the wireless interface 102b-1 in the LAA-LTE frequency band 111 and/or in the LTE frequency band 112; further, the processor 102b-2 can be configured to check if receipt of the data packet 290 is acknowledged.

Further, the processor 102b-2 can be configured to employ the first ARQ scheme 101 and/or the second ARQ scheme 502; further, the processor 102b-2 can be configured to monitor the transmission timeout by executing a threshold comparison between the transmission timeout timers 280-1, 280-2 and a respective predefined threshold.

The eNBs 102b, 102c comprise a wireless interface 102b-1. The wireless interface 102b-1 comprises a transmitter 102b-1a and a receiver 102b-1b. The wireless interface 102b-1 is configured to communicate with the UE 101 in the LAA-LTE frequency band 111 in the case of the eNB 102c and/or the LTE frequency band 112 in the case of the eNB 102b. E.g., in a case where the functionality of both eNBs 102b, 102c is co-located in a single entity, it is possible that the respective interface 102b-1 comprises two transmitters and two receivers (not shown in FIG. 8) which are respectively configured to communicate in a different one of the two frequency bands 111, 112.

Further, the eNBs 102b, 102c comprising HMI 102b-4. It is possible to receive a user input via the HMI 102b-4 and/or to output information to the user via the HMI 102b-4. The HMI 102b-4 may comprise a touchpad, a mouse, a keyboard, a voice recognition unit, one or more control lights, a display, and/or one or more buttons, etc.

Summarizing, above techniques have been describe where retransmissions of a data packet are handled primarily by a first ARQ scheme via the LAA-LTE frequency band; as a fallback, retransmission of the data packet are handled by a second ARQ scheme via the LTE frequency band. In a situation where the interference level in the LAA-LTE frequency band is comparably low, a simple and effective transmission protection can be employed; successful reception of the data packet may be achieved at a comparably low latency. Also in scenarios where the interference level in the LAA-LTE frequency band is comparably high, the overall transmission reliability may not be significantly degraded without the need of higher layer retransmissions—while, nonetheless, most traffic may be handled by the LAA-LTE frequency band. According to the techniques, the fallback is configurable; the respective control logic may reside at the cellular network and/or the UE. In order to implement the control of the fallback, control signalling may be executed; the control signalling may reside in the LTE frequency band, even if the payload traffic is handled in the LAA-LTE frequency band. Trigger criteria for triggering the fallback may be expiry of a transmission timeout timer and/or a retransmission counter; respective thresholds may be configured by the cellular network. The thresholds may be determined based on a lifetime of the data packet and/or the interference level of the LAA-LTE frequency band and/or a quality report provided by the UE.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A communication device,
   the communication device comprising:
   a wireless interface configured to communicate with a cellular network in a first frequency band and to communicate with the cellular network in a second frequency band, the second frequency band being at least partly different from the first frequency band,
   at least one processor configured to:
   send a data packet to the cellular network via the wireless interface in the first frequency band employing a first automatic repeat request scheme;
   during said sending of the data packet to the cellular network via the wireless interface in the first frequency band, monitor a transmission timeout of the data packet by executing a threshold comparison between a predetermined threshold and at least one of a transmission timeout timer and a retransmission counter, the predetermined threshold corresponds to sending of the data packet to the cellular network in the first frequency band for a time duration which is shorter than a lifetime indication of the data packet;
   check if receipt of the data packet is acknowledged by the cellular network; and
   when said checking yields that the receipt of the data packet is not acknowledged by the cellular network and depending on said monitoring of the transmission timeout, selectively perform one of:
   re-sending the data packet via the wireless interface to the cellular network in the first frequency band; or
   sending the data packet to the cellular network via the wireless interface in the second frequency band employing a second automatic repeat request scheme,
   wherein the first automatic repeat request scheme and the second automatic repeat request scheme have different transmission retry timers.

2. The communication device of claim 1,
   wherein the at least one processor is configured to selectively execute said sending of the data packet to the cellular network via the wireless interface in the second frequency band if the monitoring of the transmission timeout yields an elapsed transmission timeout of the data packet.

3. The communication device of claim 1,
   wherein the at least one processor is configured to, as part of said sending of the data packet to the cellular network via the wireless interface in the second frequency band:
   monitor a further transmission timeout of the data packet;
   when said checking yields that the receipt of the data packet is not acknowledged by the cellular network and depending on said monitoring of the further transmission timeout, selectively re-send the data packet via the wireless interface to the cellular network in the second frequency band,
   wherein the at least one processor is configured to monitor the further transmission timeout of the data packet by executing a further threshold comparison between a further predetermined threshold and at least one of a further transmission timeout timer and a further retransmission counter,
   wherein the further predetermined threshold corresponds to sending of the data packet to the cellular network in the second frequency band for a time duration which is shorter than the lifetime indication of the data packet.

4. The communication device of claim 1,
   wherein the at least one processor is configured to determine at least one of the predetermined threshold and the further predetermined threshold based on at least one of a control message received via the wireless interface from the cellular network in the second frequency band and the lifetime indication of the data packet.

5. The communication device of claim 1,
   wherein the first frequency band is an unlicensed frequency band, wherein the wireless interface is configured to transceive according to an Licensed Assisted Access LTE data transmission procedure in the first frequency band,
   wherein the second frequency band is a licensed frequency band, wherein the wireless interface is configured to transceive according an LTE-licensed data transmission procedure in the second frequency band.

6. The communication device of claim 1,
   wherein the communication device is a mobile device of a group comprising a mobile phone, a smartphone, tablet, a personal digital assistant, a mobile music player, a smart watch, a wearable electronic equipment, and a mobile computer.

7. A method, the method comprising:
   at least one processor of a communication device sending a data packet to a cellular network via a wireless interface of the communication device in a first frequency band employing a first automatic repeat request scheme;
   the at least one processor, during said sending of the data packet to the cellular network via the wireless interface in the first frequency band, monitoring a transmission timeout of the data packet by executing a threshold comparison between a predetermined threshold and at least one of a transmission timeout timer and a retransmission counter, the predetermined threshold corresponds to sending of the data packet to the cellular network in the first frequency band for a time duration which is shorter than a lifetime indication of the data packet;

the at least one processor checking if receipt of the data packet is acknowledged by the cellular network; and when said checking yields that the receipt of the data packet is not acknowledged by the cellular network and depending on said monitoring of the transmission timeout, the at least one processor selectively performing one of:

re-sending the data packet via the wireless interface to the cellular network in the first frequency band; or sending the data packet to the cellular network via the wireless interface in a second frequency band employing a second automatic repeat request scheme, the second frequency band being at least partly different from the first frequency band, wherein the first automatic repeat request scheme and the second automatic repeat request scheme have different transmission retry timers.

8. The method of claim 7,
wherein the method is executed by a communication device of claim 1.

9. A node of a cellular network,
the node comprising:
a wireless interface configured to communicate with a communication device connected to the cellular network in a first frequency band and to communicate with the communication device in a second frequency band, the second frequency band being at least partly different from the first frequency band,
at least one processor configured to:
send a data packet to the communication device via the wireless interface in the first frequency band employing a first automatic repeat request scheme;
during said sending of the data packet to the communication device via the wireless interface in the first frequency band, monitor a transmission timeout of the data packet by executing a threshold comparison between a predetermined threshold and at least one of a transmission timeout timer and a retransmission counter, the predetermined threshold corresponds to sending of the data packet to the communication device in the first frequency band for a time duration which is shorter than a lifetime indication of the data packet;
check if receipt of the data packet is acknowledged by the communication device; and
when said checking yields that the receipt of the data packet is not acknowledged by the communication device and depending on said monitoring of the transmission timeout, selectively perform one of:
re-sending the data packet via the wireless interface to the communication device in the first frequency band; or
sending the data packet to the communication device via the wireless interface in the second frequency band employing a second automatic repeat request scheme,
wherein the first automatic repeat request scheme and the second automatic repeat request scheme have different transmission retry timers.

10. The node of claim 9,
wherein the at least one processor is configured to determine a property of the first automatic repeat request scheme based on at least one of an interference situation in the first frequency band and a quality report received from the communication device.

11. The node of claim 9,
wherein the at least one processor is configured to selectively execute said sending of the data packet to the communication device via the wireless interface in the second frequency band if the monitoring of the transmission timeout yields an elapsed transmission timeout of the data packet.

12. The node of claim 9,
wherein the at least one processor is configured to, as part of said sending of the data packet to the communication device via the wireless interface in the second frequency band:
monitor a further transmission timeout of the data packet;
when said checking yields that the receipt of the data packet is not acknowledged by the communication device and depending on said monitoring of the further transmission timeout, selectively re-send the data packet via the wireless interface to the communication in the second frequency band,
wherein the at least one processor is configured to monitor the further transmission timeout of the data packet by executing a further threshold comparison between a further predetermined threshold and at least one of a further transmission timeout timer and a further retransmission counter,
wherein the further predetermined threshold corresponds to sending of the data packet to the communication device in the second frequency band for a time duration which is shorter than the lifetime indication of the data packet.

13. The node of claim 9,
wherein the at least one processor is configured to determine at least one of the predetermined threshold and the further predetermined threshold based on at least one of a interference situation of transmission in the first frequency band and the lifetime indication of the data packet,
wherein the at least one processor is further configured to send a control message indicating at least one of the predetermined threshold and the further predetermined threshold via the wireless interface to the communication device in the second frequency band.

14. The node of claim 9,
wherein the first frequency band is an unlicensed frequency band, wherein the wireless interface is configured to transceive according to an License Assisted Access data transmission procedure in the first frequency band,
wherein the second frequency band is a licensed frequency band, wherein the wireless interface is configured to transceive according an LTE-licensed data transmission procedure in the second frequency band.

15. A method, the method comprising:
at least one processor of a node of a cellular network sending a data packet to a communication device connected to the cellular network via a wireless interface of the node in a first frequency band employing a first automatic repeat request scheme;
the at least one processor, during said sending of the data packet to the communication device via the wireless interface in the first frequency band, monitoring a transmission timeout of the data packet by executing a threshold comparison between a predetermined threshold and at least one of a transmission timeout timer and a retransmission counter, the predetermined threshold corresponds to sending of the data packet to the communication device in the first frequency band for a time duration which is shorter than a lifetime indication of the data packet;

the at least one processor checking if receipt of the data packet is acknowledged by the communication device; and when said checking yields that the receipt of the data packet is not acknowledged by the communication device and depending on said monitoring of the transmission timeout, the at least one processor selectively performing one of:

re-sending the data packet via the wireless interface to the communication device in the first frequency band; or sending the data packet to the communication device via the wireless interface in a second frequency band employing a second automatic repeat request scheme, the second frequency band being at least partly different from the first frequency band, wherein the first automatic repeat request scheme and the second automatic repeat request scheme have different transmission retry timers.

* * * * *